US012592557B2

(12) United States Patent (10) Patent No.: US 12,592,557 B2

Gambuzza et al. (45) Date of Patent: Mar. 31, 2026

(54) PRE-CHARGE SHORT CIRCUIT DETECTION

(71) Applicant: Littelfuse, Inc., Chicago, IL (US)

(72) Inventors: Michael Gambuzza, Boston, MA (US); Guillermo Zatorre, San Sebastian (ES); Boris Golubovic, San Francisco, CA (US); Cesar Martinez, San Sebastian (ES)

(73) Assignee: Littelfuse, Inc., Rosemont, IL (US)

( * ) Notice: Subject to any disclaimer, the term of this patent is extended or adjusted under 35 U.S.C. 154(b) by 161 days.

(21) Appl. No.: 18/644,289

(22) Filed: Apr. 24, 2024

(65) Prior Publication Data

US 2024/0364099 A1 Oct. 31, 2024

Related U.S. Application Data

(60) Provisional application No. 63/461,789, filed on Apr. 25, 2023.

(51) Int. Cl.
H02H 7/18 (2006.01)
H02H 1/00 (2006.01)

(52) U.S. Cl.
CPC ............ H02H 7/18 (2013.01); H02H 1/0007 (2013.01)

(58) Field of Classification Search
CPC ..... H02H 7/18; H02H 1/0007; H02J 7/00304; H02J 7/0031; H02J 7/345; H02J 2310/48; H02J 7/0071; H02J 7/00714; H02J 2207/50; B60L 2240/547; B60L 2240/549; B60L 2260/42; B60L 2270/20;

B60L 3/0046; B60L 3/0092; B60L 3/12; B60L 3/04; G01R 19/16571; G01R 31/52; B60Y 2200/91; Y02T 10/70
(Continued)

(56) References Cited

U.S. PATENT DOCUMENTS 5,181,155 A * 1/1993 Beg ......................... H02H 3/08
361/87
7,868,483 B2 1/2011 Lu
(Continued)

FOREIGN PATENT DOCUMENTS

CN 105392660 A 3/2016
CN 113002303 A 6/2021
(Continued)

OTHER PUBLICATIONS

Extended European Search Report for EP Application No. 24171374.2, dated Oct. 16, 2024, 9 pages.

*Primary Examiner* — Dharti H Patel
(74) *Attorney, Agent, or Firm* — KDW Firm PLLC

(57) ABSTRACT

Disclosed is an adaptive pre-charge control circuit, for use in a solid state battery disconnect and protection system, wherein the adaptive pre-charge control circuit includes a high-voltage switch coupled between an electric battery and a DC link capacitor of an electric vehicle, and wherein the electric vehicle is powered by the electric battery. The control circuit may be operable to issue a pulse width modulated (PWM) signal to generate a current profile wherein every other pulse exceeds a predefined limit, monitor, during pre-charging, the current profile, and to determine an overcurrent fault exists in the case that two consecutive pulses exceed the predefined limit.

9 Claims, 2 Drawing Sheets

(58) Field of Classification Search
USPC ........................................................ 361/93.1
See application file for complete search history.

(56) References Cited

U.S. PATENT DOCUMENTS

| | | | | |
|---|---|---|---|---|
| 7,872,447 | B2 * | 1/2011 | Morita ................... | H02J 9/061 |
| | | | | 307/49 |
| 8,730,627 | B2 * | 5/2014 | Babb ....................... | H02H 3/24 |
| | | | | 361/56 |
| 10,090,689 | B2 | 10/2018 | Pan | |
| 10,256,024 | B1 * | 4/2019 | Rogers ..................... | H02J 1/04 |
| 2011/0141644 | A1 * | 6/2011 | Hastings ............. | H02H 1/0015 |
| | | | | 361/93.2 |
| 2011/0309809 | A1 * | 12/2011 | Rao ....................... | H02H 9/001 |
| | | | | 323/282 |
| 2012/0139514 | A1 * | 6/2012 | Paatero ................ | H02M 3/156 |
| | | | | 323/282 |
| 2012/0235661 | A1 * | 9/2012 | Roessler ............... | H02H 3/087 |
| | | | | 323/284 |
| 2013/0050880 | A1 * | 2/2013 | Rozman ................ | H02H 3/025 |
| | | | | 361/18 |
| 2015/0084404 | A1 * | 3/2015 | Hashim .................. | B60L 50/50 |
| | | | | 307/131 |
| 2015/0251542 | A1 * | 9/2015 | Mensah-Brown ...... | B60L 50/40 |
| | | | | 307/10.1 |
| 2015/0256070 | A1 * | 9/2015 | Lee ........................ | H02P 27/08 |
| | | | | 323/283 |
| 2017/0305274 | A1 * | 10/2017 | Saha .................... | H02H 7/1227 |
| 2017/0331400 | A1 * | 11/2017 | Saha ....................... | H02P 29/00 |
| 2020/0039375 | A1 * | 2/2020 | Ammanamanchi Venkata .......... | |
| | | | | H02J 7/02 |
| 2021/0184456 | A1 * | 6/2021 | Suzuki ..................... | B60L 3/00 |
| 2022/0006285 | A1 * | 1/2022 | Dukaric ............... | H05K 7/2089 |
| 2022/0131398 | A1 * | 4/2022 | Herranz ................ | B60L 53/63 |
| 2023/0286388 | A1 * | 9/2023 | Prasad ................... | B60L 58/15 |
| 2024/0131950 | A1 * | 4/2024 | Gambuzza ............... | B60L 3/04 |
| 2024/0223070 | A1 * | 7/2024 | Nakagawa ............. | H02M 1/36 |
| 2024/0339990 | A1 * | 10/2024 | Namuduri ............ | H02J 7/0063 |

FOREIGN PATENT DOCUMENTS

| | | | | |
|---|---|---|---|---|
| DE | 102018207247 | A1 * | 6/2019 | ............ H02H 3/087 |
| EP | 3421287 | A1 | 1/2019 | |
| JP | 2005065459 | A | 3/2005 | |
| JP | 2008022597 | A | 1/2008 | |
| JP | 2011211761 | A | 10/2011 | |
| JP | 2012019640 | A | 1/2012 | |
| JP | 201244844 | A | 3/2012 | |
| JP | 2012070567 | A | 4/2012 | |
| JP | 2015216776 | A | 12/2015 | |
| JP | 2016127347 | A | 7/2016 | |
| WO | 2020194341 | A1 | 10/2020 | |

* cited by examiner

PRE-CHARGE SHORT CIRCUIT DETECTION

CROSS-REFERENCE TO RELATED APPLICATION

This application claims priority to U.S. Provisional Patent Application No. 63/461,789, filed Apr. 25, 2023, entitled "Pre-Charge Short Circuit Protection," which is incorporated by reference herein in its entirety.

FIELD OF THE DISCLOSURE

Embodiments of the present disclosure relate to solid state battery disconnect and protection circuits, including a pre-charge control function.

BACKGROUND

Pre-charge circuits are used in high voltage DC applications with capacitive loads that can result in high inrush currents during power up. Pre-charge of the powerline voltages is a preliminary mode which limits the inrush current. The pre-charge circuits thus prevent damage to system components by blocking high amperage current spikes.

A high voltage system with a large capacitive load can be exposed to high electric current during initial turn-on. If not limited, the current can cause considerable stress or damage to the system components, including, but not limited to, causing contactors to weld closed.

In electric vehicle applications, battery disconnects are implemented using contactors, overcurrent protection is implemented with a combination of the same contactors controlled by specific circuitry and additional protection elements such as fuses or pyrofuses, and pre-charge control is implemented with additional dedicated circuitry.

In electric vehicle applications, the large capacitive load is the DC link in the electric motor. The "DC link capacitor" is actually the sum of several parallel capacitors in the subunits within the electric vehicle, one for the electric motor, another for the air conditioning compressor, another for the window enabling, and so on.

Pre-charging of the DC link capacitor will occur with each vehicle start. The battery voltage may be different in each vehicle start, depending on the battery charge state. Thus, the battery voltage may be any value within the operating range of the battery, for example, 550V-800V in an 800V battery system. The pre-charging circuit limits the inrush current to slowly charge the downstream DC link capacitor. Once the voltage of the DC link capacitor is close to that of the battery, the main switches are permitted to close. Pre-charge circuits thus allow the current to flow in a controlled manner during vehicle startup.

Pre-charge circuits in electric vehicles, built by an auxiliary switch in series with a large value resistance and placed in parallel with the main switch, control the inrush current going into the vehicle during startup. The main switch is open and the auxiliary switch closed, so that the DC link capacitor is slowly charged, as determined by the resistance. Once the DC link capacitor is sufficiently charged (so that its voltage is close to that of the battery), the main switch is closed all the way and the battery is able to safely supply power to the vehicle.

However, pre-charge systems based on pulse-width modulation (PWM) control are usually operated above the nominal current for fast pre-charge function. In this use case, it is difficult to discriminate real overcurrent fault conditions.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

In one approach, an adaptive pre-charge control circuit, for use in a solid state battery disconnect and protection system, may include a high-voltage switch coupled between an electric battery and a DC link capacitor of an electric vehicle, wherein the electric vehicle is powered by the electric battery, and a control circuit. The control circuit may be operable to issue a pulse width modulated (PWM) signal to generate a current profile wherein every other pulse exceeds a predefined limit. The control circuit may be further monitor, during pre-charging, the current profile, and determine an overcurrent fault exists in the case that two consecutive pulses exceed the predefined limit.

In another approach, an adaptive pre-charge control circuit, for use in a solid state battery disconnect and protection system, may include a high-voltage switch coupled between an electric battery and a DC link capacitor of an electric vehicle, wherein the electric vehicle is powered by the electric battery, and a control circuit. The control circuit may be operable to issue a pulse width modulated (PWM) signal to generate a current profile, measure, during pre-charging, a voltage increment of a voltage, $V_{out}$ of the DC link capacitor, and determine an overcurrent fault exists in the case that the voltage increment is not positive after applying a pulse.

In yet another approach, an adaptive pre-charge control circuit, for use in a solid state battery disconnect and protection system, may include a high-voltage switch coupled between an electric battery and a DC link capacitor of an electric vehicle, wherein the electric vehicle is powered by the electric battery, and a control circuit. The control circuit may be operable to issue a pulse width modulated (PWM) signal to generate a current profile, wherein in a normal state every other pulse of a plurality of pulses exceeds a predefined limit, monitor, during pre-charging, the current profile, and determine an overcurrent fault exists when a deviation from the normal state is observed, wherein the deviation from the normal state is observed when two consecutive pulses of the plurality of pulses exceed the predefined limit.

BRIEF DESCRIPTION OF THE DRAWINGS

The accompanying drawings illustrate exemplary approaches of the disclosed embodiments so far devised for the practical application of the principles thereof, and in which.

Figure 1:
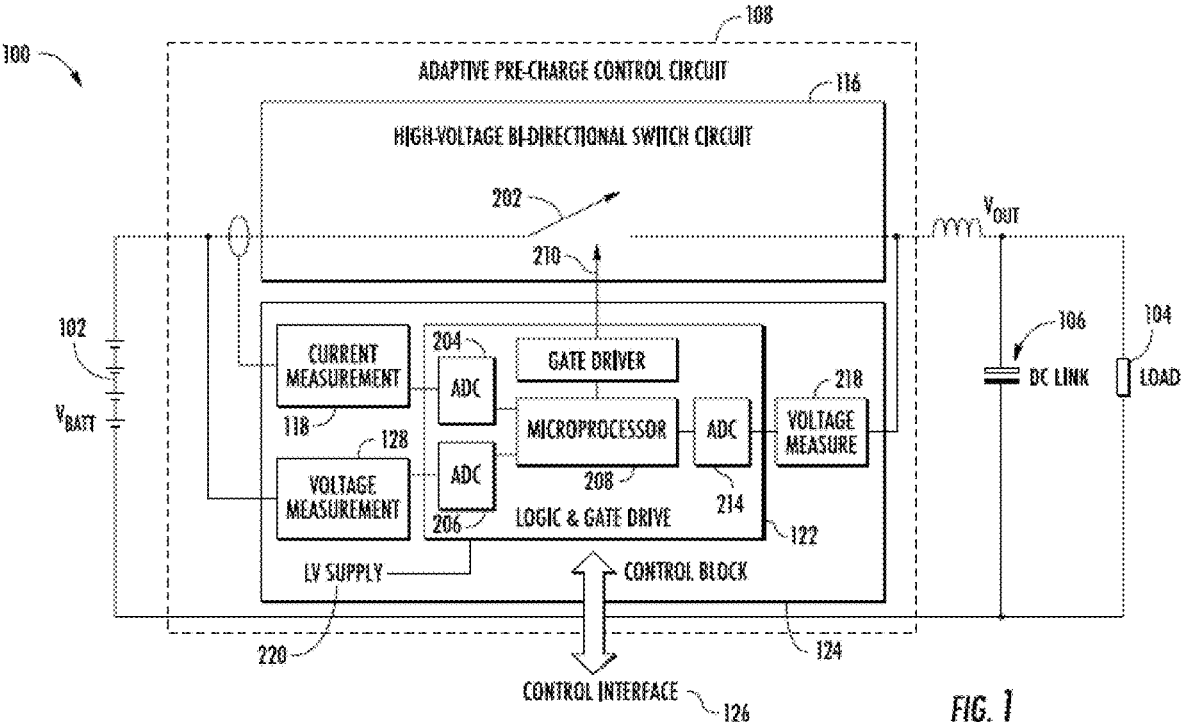
FIG. 1 is a diagram illustrating an adaptive pre-charge control circuit for use in an electric vehicle system, in accordance with exemplary embodiments.

The drawings are not necessarily to scale. The drawings are merely representations, not intended to portray specific parameters of the disclosure. The drawings are intended to depict exemplary embodiments of the disclosure, and therefore are not to be considered as limiting in scope. In the drawings, like numbering represents like elements.

DETAILED DESCRIPTION

The present disclosure will now proceed with reference to the accompanying drawings, in which various approaches are shown. It will be appreciated, however, that the re-usable snap-in fitting may be embodied in many different forms and should not be construed as limited to the approaches set forth herein. Rather, these approaches are provided so that this disclosure will be thorough and complete, and will fully convey the scope of the disclosure to those skilled in the art.

An adaptive pre-charge control circuit is disclosed for providing pre-charge capability in an electric vehicle. The adaptive pre-charge control circuit is disposed between an electric battery that supplies power to an electric vehicle and the load of the electric vehicle. By issuing a pulse-width modulated signal to a high-voltage switch, the voltage of a DC link capacitor representing the capacitors of the vehicle load can be changed. Once the voltage of the DC link capacitor is close to that of the electric battery, the high-voltage switch is turned on, enabling current to safely be delivered to the load. The adaptive pre-charge control circuit includes overvoltage protection and current limiting features. As will be further described herein, embodiments of the present disclosure can reliably detect overcurrent fault condition in fast PWM-based precharge functions using a defined current pattern (e.g., one current pulse above, one current pulse below the overcurrent threshold) and/or measurement of the output voltage.

FIG. 1 is a representative drawing of an adaptive pre-charge control circuit 108 for providing pre-charge capability in a solid state battery disconnect and protection system 100, according to exemplary embodiments. The solid state battery disconnect and protection system 100 consists of an electric vehicle (EV) battery 102, a load 104, and a DC link capacitor 106, with the adaptive pre-charge control circuit 108 disposed between the EV battery 102 and the load 104. Principally, the load 104 is an EV motor of an electric vehicle, but the load also includes other powered components within the electric vehicle, such as air conditioning compressors, window enabling motors, and so on. Each subunit in the vehicle has an input capacity, with the individual capacitors and number of subunits being unknown. The sum of individual capacitors is the DC link capacity ($C_{DC}$), symbolized by the DC link capacitor 106.

The adaptive pre-charge control circuit 108 is a solid state battery disconnect and protection circuit featuring a high-voltage bi-directional switch circuit 116, or high-voltage switch 116 for short, and a control block 124. Solid state battery disconnect and protection circuits use a microprocessor or microcontroller coupled with a current sensor to sample a waveform and detect any overcurrent scenarios. Solid state battery disconnect and protection circuits have very fast response time relative to traditional circuit breakers. The high-voltage switch 116 of the adaptive pre-charge control circuit 108 turns on (closes) or off (opens) to control (enable or prevent) current flow between the EV battery 102 and the load 104. In exemplary embodiments, the control block 124 issues a PWM signal 210 to the high-voltage switch 116, causing a switch 202 therein to turn on and off at a ratio based on the duty cycle of the PWM signal. The on/off rate or number of switching events per time is defined by the PWM switching frequency. The duty cycle defines the ratio between on-time and the switching period.

A voltage, $V_{batt}$, of the EV battery 102 and a voltage, $V_{out}$, of the DC link capacitor 106 are shown. In exemplary embodiments, the adaptive pre-charge control circuit 108 is designed to enable slow charging of the DC link capacitor 106 until its voltage is close to the voltage of the EV battery 102. Once a predefined difference, $V_{diff}$, between $V_{out}$ and $V_{batt}$ is reached, the high-voltage switch 116 will turn on (close), allowing current to flow freely between the EV battery 102 and the load 104. In this way, the EV battery 102 is able to safely power the load. Stated mathematically, once $V_{batt}-V_{out} \leq V_{diff}$ then the switch will remain closed until the electric vehicle is turned off.

The control block 124 features a microprocessor 208 and three analog-to-digital converters (ADCs) 204, 206, and 214. In other embodiments, the control block 214 may be an equivalent integrated circuit. The ADC 204 measures the battery voltage, $V_{batt}$, while the ADC 206 measures the output voltage, $V_{out}$. Before a computation can be made, the microprocessor 208 is presented with a measurement or a digital representation of the battery voltage, $V_{batt}$, and the output voltage, $V_{out}$. The ADC 204 measures and converts the voltages to digital values, while the ADC 206 measures current. The microprocessor 208 can then read these results and compute the voltage difference, $V_{diff}$. Further, the microprocessor 208 generates the PWM pattern to turn the switch 202 on and off. The control block 124 also features current measurement 118 and voltage measurement 128 at the input, $V_{batt}$, as well as voltage measurement 218 at the output, $V_{out}$. In exemplary embodiments, the logic and the gate drive of the adaptive pre-charge control circuit 108 cause issuance of the PWM signal 210 to the high-voltage switch 116. The PWM signal 210 will enable the high-voltage switch 202 to be turned on or off, thus enabling or preventing current flow between the EV battery 102 and the DC link capacitor 106. The adaptive pre-charge control circuit 108 thus implements pre-charge control with a PWM control signal, controlling the pulse width profile to control the current. The logic and gate drive 122 of the control block 124 is connected to a control interface 126, which may be a wired or a wireless connection.

In exemplary embodiments, the PWM signal 210 of the adaptive pre-charge control circuit 108 supports more reliable pre-charge using a defined current pattern (e.g., one current pulse above, one current pulse below the overcurrent threshold) and/or measurement of the output voltage.

In exemplary embodiments, the sensor used by the current measurement 118 is a Hall-effect sensor that has a predefined threshold such that, when the current reaches the threshold, a logic signal will be issued to the logic and gate drive 122. As an alternative to using Hall sensors, the current measurement 118 may use shunt resistances to sense an overcurrent, in some embodiments. It will be appreciated, that virtually any current sensor type may be used in alternative embodiments. In exemplary embodiments, the adaptive pre-charge control circuit 108 also includes a current limiting function. The current sensor in FIG. 1 consists of the current measurement 118, with the circle denoting the wire being measured. The magnetic flux generated by the flowing current is converted to a voltage via the Hall effect. The voltage is compared to a reference in the sensor that represents the threshold voltage indicating an overcurrent. When an overcurrent occurs, a single logic signal is generated and sent to the logic and gate drive 122. In exemplary embodiments, this happens within a microsecond timeframe.

If the current exceeds a certain limit (e.g., twice consecutively), the current limiting function is triggered and the adaptive pre-charge control circuit 108 disconnects the battery and load (and stops charging). Without the current limiting function, the current would rise unbounded, stressing or damaging components and interconnects.

In exemplary embodiments, the switch 202 of the high-voltage switch 116 is a solid state switching device, such as an insulated gate bipolar junction transistor (IGBT), a semiconductor such as a power metal-oxide semiconductor field-effect transistor (MOSFET), a thyristor, a silicon-controlled rectifier (SCR), a triode for alternating current (TRIAC), or any other suitable high-power controlled solid state device. The switch 202 connects or disconnects the EV battery 102 to the vehicle's high-voltage on-board systems. In exemplary embodiments, the switch 202 is bi-directional to allow the EV battery 102 to supply the vehicle (load 104) and to allow a charger to supply the battery. In exemplary embodiments, the switch 202 is controlled by a PWM signal 210 coming from the control block 124.

Pre-charge circuits are commonly part of high-voltage systems, such as electronic vehicle systems, in which downstream capacitance can be exposed to inrush current when the vehicle is turned on. These pre-charge circuits typically have a large value resistor that is switched on before the vehicle is started and the DC link capacitor is slowly charged. Once the capacitor is sufficiently charged, the switch is closed entirely. Having a set pre-charge threshold does not account for battery discharge after vehicle use. Further, the prior art pre-charge circuits do not utilize pulse-width modulation to control the charging, as is done with the adaptive pre-charge control circuit 108. The adaptive pre-charge control circuit 108 thus provides a novel method to detect battery discharge and set a pre-charge threshold based on initial and final values of battery charge, while also more reliably detecting an overcurrent fault condition using one or more defined current pattern (e.g., one current pulse above, one current pulse below the overcurrent threshold) and/or measurement of the output voltage.

Figure 2:
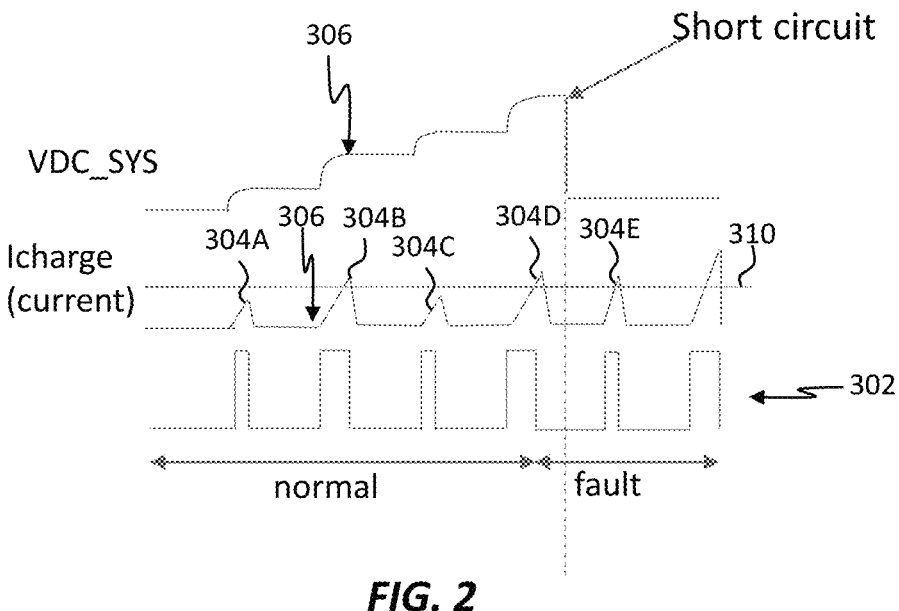
FIG. 2 is a diagram illustrating the operating principle of pulse width modulation used by the adaptive pre-charge control circuit of FIG. 1, according to exemplary embodiments.

FIG. 2 is a representative drawing of the operating principle of pulse width modulation used by the adaptive pre-charge control circuit 108, according to an exemplary embodiment. In this embodiment, the PWM pattern can be defined to generate a specific current profile including a plurality of current pulses, such as one current pulse above, followed by one current pulse below the overcurrent threshold. For the adaptive pre-charge control circuit 108, after turning on the bi-directional switch 202, the charging current 301 ($I_{charge}$), builds up. In FIG. 2, pulse intervals 302 are shown, with small amounts of current 304 being issued at each pulse. As the DC link capacitor 106 is initially at zero volts, the charging current without control would be similar to a short circuit current and potentially lead to destruction. By issuing a short pulse, the current remains within safe limits and the DC link capacitor 106 is charged nominally. As the current is driven by the voltage difference, $V_{diff}$, between the battery voltage, $V_{batt}$, and the DC link voltage, $V_{DC\_SYS}$ 306 ($V_{out}$ in FIG. 1), a growing DC link voltage, leads to a lower current for the next pulse. With each pulse, the DC link voltage 306 is increased. As shown, the charging current 301 can be defined so that only every second pulse (i.e., every other pulse) exceeds limit 310. That is, a first pulse 304A is below limit 310, a second pulse 304B is above limit 310, a third pulse 304C is below limit 310, a fourth pulse 310D is above limit 310 and a fifth pulse 304E is also above limit 310. Because two consecutive current pulses (304D, 304E) are above limit 310, a real overcurrent fault is detected. Said differently, the real overcurrent fault is detected when a deviation from a normal state (i.e., one current pulse below, one current pulse above, one current pulse below, etc.) is observed. A trip may then occur.

In some embodiments, the overcurrent protection circuit is resettable. That is, when the circuit protection is tripped, the system may try again after a certain time to verify if the overcurrent condition remains, or if it was caused by a noise of some other transient effect. Upon reconnection, a similar method (e.g., the use of a defined PWM pattern) can be used to detect overcurrent events, even if the device is not in pre-charge mode (so the DC-Link voltage is close to the battery voltage).

Figure 3:
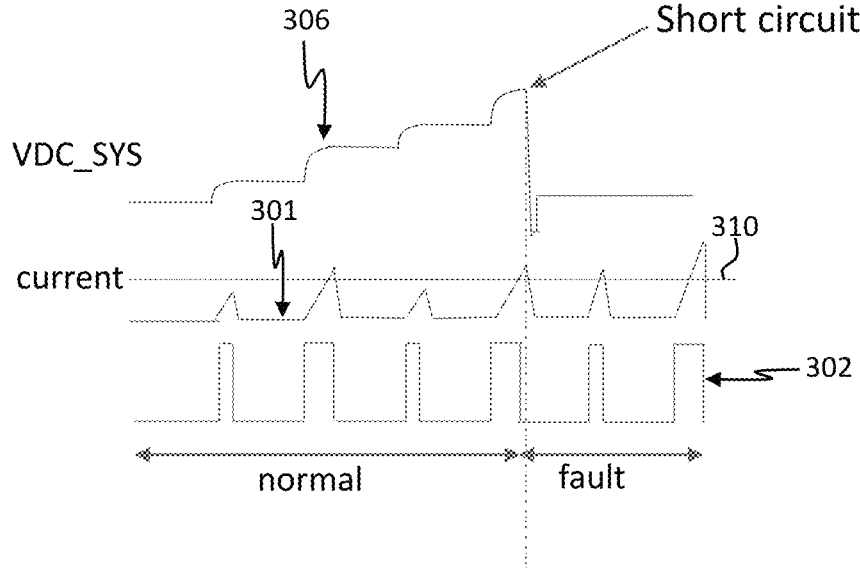
FIG. 3 is a diagram illustrating the operating principle of pulse width modulation used by the adaptive pre-charge control circuit of FIG. 1, according to exemplary embodiments.

FIG. 3 is a representative drawing of the operating principle of pulse width modulation used by the adaptive pre-charge control circuit 108, according to another exemplary embodiment. In this embodiment, the PWM pattern is again defined to generate a specific current profile. In this example, the overcurrent threshold is disabled during pre-charge, and the voltage increment in $V_{DC\_SYS}$ 306 is measured. If the voltage increment is not positive after applying a pulse, this indicates a real overcurrent fault for the current 301.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. An adaptive pre-charge control circuit, for use in a solid state battery disconnect and protection system, the adaptive pre-charge control circuit comprising:
   a high-voltage switch coupled between an electric battery and a DC link capacitor of an electric vehicle, wherein the electric vehicle is powered by the electric battery; and
   a control circuit operable to:
      issue a pulse width modulated (PWM) signal to generate a current profile wherein every other pulse exceeds a same predefined limit;
      monitor, during pre-charging, the current profile; and
      determine an overcurrent fault exists only in the case that two consecutive pulses exceed the same predefined limit, and determining that no overcurrent fault exists when one pulse exceeds the same predefined limit.

2. The adaptive pre-charge control circuit of claim 1, wherein the control circuit is further operable to open the high-voltage switch when the overcurrent fault is determined.

3. The adaptive pre-charge control circuit of claim 1, further comprising resetting the control circuit following the overcurrent fault.

4. An adaptive pre-charge control circuit, for use in a solid state battery disconnect and protection system, the adaptive pre-charge control circuit comprising:
   a high-voltage switch coupled between an electric battery and a DC link capacitor of an electric vehicle, wherein the electric vehicle is powered by the electric battery; and
   a control circuit operable to:
      issue a pulse width modulated signal to generate a current profile;
      measure, during pre-charging, a voltage increment of a voltage, $V_{out}$ of the DC link capacitor; and determine an overcurrent fault only exists in the case that the voltage increment is not positive after applying two consecutive pulses, and determining that no overcurrent fault exists in the case that the voltage increment is not positive after applying a single pulse.

5. The adaptive pre-charge control circuit of claim 4, wherein the control circuit is further operable to open the high-voltage switch when the overcurrent fault is determined.

6. The adaptive pre-charge control circuit of claim 4, further comprising resetting the control circuit following the overcurrent fault.

7. An adaptive pre-charge control circuit, for use in a solid state battery disconnect and protection system, the adaptive pre-charge control circuit comprising:
   a high-voltage switch coupled between an electric battery and a DC link capacitor of an electric vehicle, wherein the electric vehicle is powered by the electric battery; and
   a control circuit operable to:
      issue a pulse width modulated (PWM) signal to generate a current profile, wherein in a normal state every other pulse of a plurality of current pulses exceeds a same predefined limit;
      monitor, during pre-charging, the current profile; and
      determine an overcurrent fault exists when a deviation from the normal state is observed, wherein the deviation from the normal state is observed only when two consecutive current pulses of the plurality of current pulses exceed the same predefined limit, and wherein the deviation from the normal state is not observed when only one pulse exceeds the same predefined limit.

8. The adaptive pre-charge control circuit of claim 7, wherein the control circuit is further operable to open the high-voltage switch when the overcurrent fault is determined.

9. The adaptive pre-charge control circuit of claim 7, further comprising resetting the control circuit following the overcurrent fault.

* * * * *